(12) United States Patent
Gupta et al.

(10) Patent No.: US 6,577,599 B1
(45) Date of Patent: Jun. 10, 2003

(54) SMALL-SCALE RELIABLE MULTICASTING

(75) Inventors: Amit Gupta, Fremont, CA (US); Michael Speer, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/344,264

(22) Filed: Jun. 30, 1999

(51) Int. Cl.[7] .................................................. H04J 3/14
(52) U.S. Cl. ...................................... 370/236; 370/238
(58) Field of Search ................................ 370/236, 238, 370/401, 328, 252; 709/238, 220

(56) References Cited

U.S. PATENT DOCUMENTS

| | | | | |
|---|---|---|---|---|
| 5,608,726 A | * | 3/1997 | Virgile | 370/401 |
| 5,905,871 A | * | 5/1999 | Buskens et al. | 709/238 |
| 6,118,771 A | * | 9/2000 | Tajika et al. | 370/328 |
| 6,434,626 B1 | * | 8/2002 | Prakash et al. | 709/220 |

OTHER PUBLICATIONS

Marinho P. Barcellos and Paul D. Ezhilchelvan, An End-to-End Reliable Multicast Protocol Using Polling for Scaleability, Proceedings from the IEEE INFOCOM '98 Conference on Computer Communications, Mar. 29–Apr. 2, 1998, San Francisco, California.

Christoph Hanle and Markus Hofmann, Performance Comparison of Reliable Multicast Protocols Using the Network Simulator ns-2, Proceedings from the IEEE 23rd Anuual Conference on Local Computer Networks (LCN '98), Oct. 11–14, 1998, Lowell, Massachusetts.

PGM Host, Cisco Systems, Inc. [retrieved on Mar. 8, 2001]. Retrieved from the Internet: {http://www.cisco.com/univercd/cc/td/doc/product/software/ios121/121newft/121t/121tI/dtpgmhst.htm#xtocid16930}.

* cited by examiner

*Primary Examiner*—Salvatore Cangialosi
(74) *Attorney, Agent, or Firm*—Gunnison, McKay & Hodgson, L.L.P.; Philip J. McKay (57) ABSTRACT

A method and apparatus for efficient and reliable multicasting in a network environment. In embodiments of the invention, a sender transmits identical information encapsulated in data packets to a plurality of receivers. Periodically, receivers submit responses that include control information regarding the loss or receipt of data packets transmitted by the sender. Using these information a sender retransmits any undelivered packets to intended receivers. Responses submitted by the participating receivers, generate a traffic flow that can consume a substantial portion of the network bandwidth. Thus, in embodiments of the invention, the rate at which the responses are submitted is monitored and controlled to minimize control traffic. Over congestion of the network bandwidth with control information is undesirable as it adversely effects the data transmission rate. Thus, in embodiments of the invention, packet loss responses are generated at time intervals. These intervals are adjustable based on the performance of the receivers. A time interval in generation of packet loss information may result in a lower error correction rate. However, since the control traffic that results from the generation of the responses is monitored, the failure states associated with an over congested network bandwidth are minimized.

16 Claims, 7 Drawing Sheets

SMALL-SCALE RELIABLE MULTICASTING

BACKGROUND OF THE INVENTION

1. Field of the Invention

This invention relates to the field of computer software and more specifically to the efficient and reliable multicasting of information in a network environment. Portions of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Solaris, "Write Once, Run Anywhere", Java, JavaOS, JavaStation and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Computer networks, especially the Internet, are used to propagate information to multitudes of users. Sometimes, the Internet is used to broadcast identical information from a network node (i.e. a "server" or a "sender") to many network endpoints (i.e., "clients" or "receivers"). This is known as "multicasting." Examples of multicasting include the broadcasting of video and/or audio information of a lecture in one classroom to many other classrooms, or the broadcast of current stock market figures from a main source (e.g., a Bloomberg market news server) to numerous Internet news web sites (e.g., CNN, MSNBC, etc.).

Figure 6:
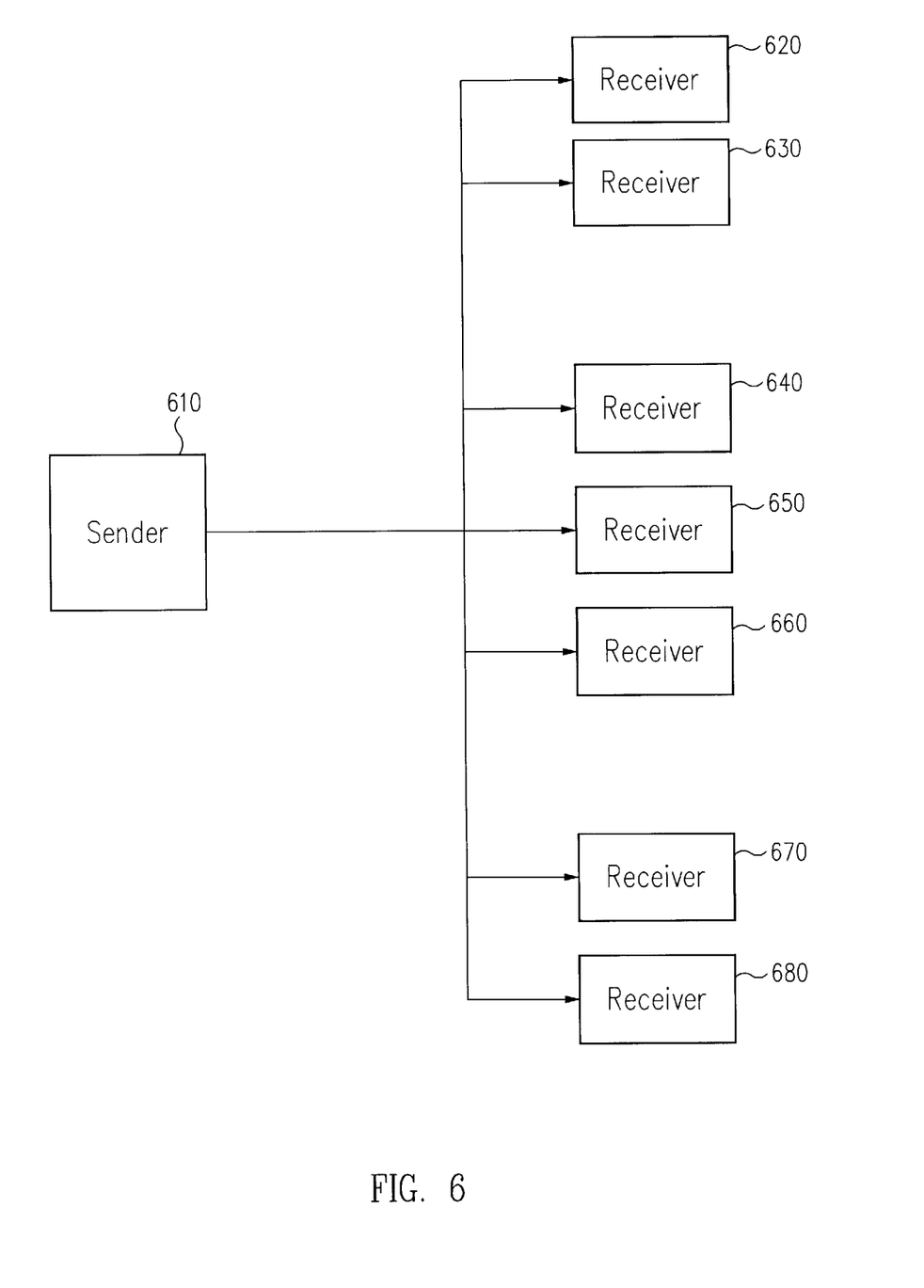
FIG. 6 is a block diagram of a multicast environment, illustrating a sender and multiple receivers.

FIG. 6 is a block diagram of a multicast environment, illustrating a sender and multiple receivers. Identical messages can be sent from sender 610 to receivers 620 through 680 as members of one multicast group. Alternatively, receivers 620 and 630 can form one multicast group, while receivers 640 through 660, and 670 through 680 form additional multicast groups.

Current methods for multicasting are designed to enable the multicasting of information to thousands of receivers. However, most actual uses for multicasting are only to a relatively small number of users, and therefore most prior art schemes do not work well for most multicasting situations.

The above referenced problems can be understood from a review of a general description of a network environment, including the Internet, communication protocols, and the current multicasting schemes.

Networks

In modern computing environments, it is common to employ multiple computers or workstations linked together in a network to communicate between, and share data with, network users. A network also may include resources, such as printers, modems, file servers, etc., and may also include services, such as electronic mail, broadcasting or multicasting services. A resource can, for example, simultaneously provide or transmit information to a plurality of users as requested.

A network can be a small system that is physically connected by cables or via wireless communication (a local area network or "LAN"). Alternatively, several separate networks can be connected together to form a larger network (a wide area network or "WAN"). Other types of networks include the Internet, telcom networks, Intranet, extranets, wireless networks, and other networks over which electronic, digital and/or analog data may be communicated.

The Internet

The Internet is a client/server system that includes a worldwide network of interconnected computers. A "client" is the computer that is used to access the Internet. An Internet client accesses a computer on the network ("server") via an Internet provider. An Internet provider is an organization that provides a client with access to the Internet (via analog telephone line or Integrated Services Digital Network line, for example). Typically, when a user logs onto the Internet or the World Wide Web (WWW), using a client computer, the user views "web pages" that are stored on a remote server. Information including data files, and the web pages are often transferred between the client and the server.

A client can, for example, download a file from or send an electronic mail message to another computer/client using the Internet. A client may also participate in a multicast session, for example, to tune into a radio show transmitted via the Internet. The server or the client may have to evaluate the type of data transferred (e.g., text, audio, video, etc.) prior to processing the data. One method of data transmission may be more efficient than another method depending on the type of data being transferred, and/or the number of users the data is intended for.

Network Communication/Data Transfer

Information servers maintain information that are transferable through the WWW and are capable of processing a client request to access that information. Information servers can implement a multicast session for transmittal of identical information to a group of clients. To enable the computers on a network to communicate with each other, a set of standardized rules for exchanging the information between the computers, referred to as a "protocol" is utilized.

Communication protocols generally specify the data format, timing, sequencing, and error checking of data transmissions. Various communication protocols are used in the networking environment. For example, one communication protocol is referred to as the transmission control protocol/Internet protocol ("TCP/IP"). The TCP/IP communication protocol includes a set of communication protocols used on the Internet and on many multiplatform networks.

The TCP/IP protocol family is made up of numerous individual protocols (e.g., file transfer protocol ("FTP"), transmission control protocol ("TCP"), and network terminal protocol ("TELNET")). The TCP protocol is responsible for breaking up a message to be transmitted and including it in packets of manageable size, reassembling the message at the receiving end, resubmitting any packets that get lost (i.e., are not delivered), and reordering the data included in the packets in the appropriate format. A "packet" is an encapsulated form of data or information (also referred to as a "datagram") that is transferred or passed across the Internet according to the communication protocol standards. A packet contains a source and destination address along with the information intended for transmission.

The TCP transfer protocol is often utilized to transmit large amounts of information because of its ability to break up information into packets and to reassemble the information at the receiving end. Other communication protocols (e.g., multicasting protocols) manage other functional aspects of information communication, and thus operate on a higher level than the TCP/IP protocol. These higher level protocols utilize TCP/IP as the underlying means for communication of information.

To transfer information, a higher level protocol defines a set of commands that one machine sends to another (e.g., commands to specify who the sender of the message is, who it is being sent to, and the text of the message) encapsulated in a series of packets encoded according to the specifications of that communication protocol. Those packets in turn are broken up, as needed, and encapsulated in TCP/IP packets so that they are transmitted to a destination on the network, via the TCP/IP protocol.

Real Time Transport Protocol (RTP)

A communication protocol that runs on top of the TCP/IP and is utilized to control the multicast of media information is the Real Time Transport Protocol ("RTP"). RTP is used to transmit packets of audio and video information on a network. An RTP packet is a data packet consisting of a header, a list of sources, and the information intended for transmission. Typically, a single RTP packet is contained in one packet of the underlying protocol (e.g., TCP/IP). Therefore, the rate of transfer of audio/video information is at least equal to the rate of transmission of TCP/IP packets.

Multicasting of information from a source to a number of receivers takes place during an established RTP session. For each receiver, the session is established via a particular set of destination addresses, for example, a network address and a port address for RTP. A port is an abstraction that protocols use to distinguish among multiple destinations within a given host computer. As such, the destination address may be common for all receivers, for example, as in the case of transmission to a group of receivers in the same network. Alternatively, each receiver may have a different destination address, for example, as in the case of individual transmissions to receivers located on multiple networks.

One common problem associated with data transmission on a network is data loss. For example, the Internet, like other packet networks, occasionally loses and orders the retransmission of lost data packets. To cope with these impairments, an RTP packet contains a sequence number that allows the receivers to detect out of sequence packets and reorder the packets that have not been delivered.

Various schemes have been implemented to reduce the number of packet losses and to enhance the transmission rate of media data in a multicasting environment. For a better understanding of the invention and its advantages, a brief summary of the current multicasting techniques and the problems associated with them is included below.

Real Time Transport Control Protocol (RTCP Protocol)

Data transport via the RTP may be augmented by a control protocol (RTCP) to allow monitoring of the data-loss in a manner scaleable to large multicast networks, and to provide minimal control and identification functionality. One existing technique known to the inventors for enhancing the speed and efficiency of information transport is the RTCP.

The RTP control protocol (RTCP) is based on the periodic transmission of control packets to all receivers in an RTP session. A control packet (RTCP packet) includes information relating to the successful delivery of data packets (i.e., indicating which packets have been received successfully, or those that have been lost during transmission). Thus, RTCP's primary function is to provide feedback or a response on the quality of the data distribution via the RTP.

The feedback may be directly useful for controlling the flow of data and data congestion in a network. Responses generated by the receivers are compiled into a comprehensive report sent to all receivers. The report is used to diagnose and repair faults in data delivery. For example, based on the report the rate of data distribution may be enhanced by updating a receiver's response rate and determining whether data delivery problems are directed to a group of receivers or if they are global.

The transmission of responses creates network traffic (i.e., "control traffic") in addition to the normal network traffic associated with data transmission. As a result, control traffic grows linearly with the number of receivers in a multicast session. RTP is designed to allow the multicast of information to audiences of various sizes ranging from a few to tens of thousands. Therefore, to avoid congesting the network traffic by a large volume of control data that are transported via the RTCP packets, the receiver's response rate must be controlled.

For each multicast session, it is assumed that the data traffic is subject to an aggregate limit called the "session bandwidth" to be divided among all the receivers. Bandwidth is a measure in data communications that signifies the maximum data transmission capacity during a communication session. Typically, a session bandwidth is limited as enforced by the network. Control traffic associated with the transmission of RTCP packets is limited to a small and known fraction of the session bandwidth, so that the primary function of the transport protocol (i.e. transport of media data) is not impaired.

Local Repair

To ensure the reliability and accuracy of information communicated from a sender to a receiver, lost information packets must be retransmitted by a sender to the intended receivers. Typically, transported information is embedded in identifiable communication packets, so that a receiver can detect information packets that are out of sequence. When a receiver detects that a series of received packets are out of sequence, the receiver can request the sender to resubmit any missing packets.

One information recovery scheme is referred to as "local repair". In this scheme, a receiver does not forward a request to the sender for retransmission of lost packets. Instead, it queries a local receiver to determine whether that receiver has received the missing packet, and requests the delivery of that packet from the queried receiver.

For example, in a multicast environment, receivers can be grouped together based on certain shared characteristic, (e.g., a number of receivers may be members of the same network, or a number of receivers may be grouped together based on geographic location, or their data communication attributes) forming a multicast group. If for any reason one of the receivers in a group does not receive an information packet broadcasted to the multicast group, then instead of contacting the sender it can request a receiver within the group for the undelivered packet.

Referring to FIG. 6, for example, receivers 620 and 630 are in one multicast group and therefore receive identical packets of information at the same time. Thus, receivers 620 and 630 are considered local to one another. In a local repair scheme, if for example receiver 620 does not receive a packet, it requests local receiver 630 for a copy of the lost packet, instead of asking server 610 to retransmit that packet.

A problem with the local repair multicasting scheme is that information transmitted by a local receiver may not be as reliable as information provided by the sender. There is a chance that transmitted information from a local receiver may be corrupted or altered for various reasons. Consider for example two broadcasting stations that rely on the Bloomberg news network for the latest stock market information. If the two stations are in competition with each other, it would be undesirable for one to rely on the other for retransmission of any information, especially information as critical and vital as stock market figures.

Using the local repair scheme, a requesting receiver is unable to verify the authenticity and accuracy of information it receives from a local receiver. Thus, more secure error recovery methods are needed that can be used in a multicast environment.

Polling Receivers for Feedback

Some current multicasting schemes are implemented so that a sender may adjust the flow and frequency of control traffic generated by the receivers. In this multicasting scheme, the sender polls each receiver for feedback. For example, a sender may from time to time send a polling message to all or a group of receivers requesting a response including data-loss information. This scheme relies on the responses received from the polled receivers for retransmitting any undelivered or lost packets. The sender analyzes the responses and determines which packets should be resubmitted. The missing information packets are then retransmitted based on a predetermined policy.

Figure 7:
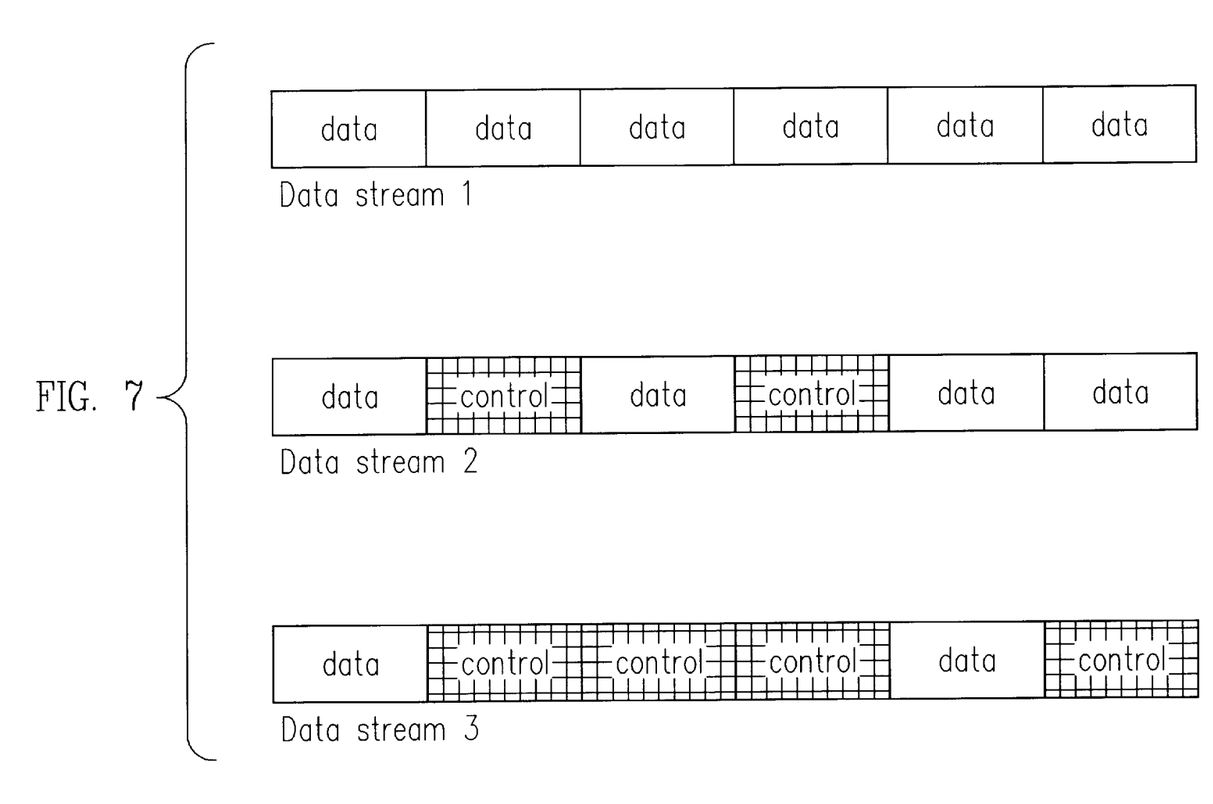
FIG. 7 is a block diagram illustrating data streams 1 through 3, each comprising data and/or control packets.

FIG. 7 is a block diagram illustrating data streams 1 through 3, each comprising data and/or control packets. Data stream 1 is an example of a communication stream that is comprised of data packets only. It is representative of an environment where no control information is transported. Thus, the entire communication bandwidth is dedicated to transmission of data.

Data stream 2 is an example of a communication stream comprised of both data packets and control information. The control information can be generated, for example, in a polling scheme both by the sender in form of polling messages, and also by the receivers in form of responses to the polling messages. The combination of this messages and responses creates control traffic that is in addition to the normal data traffic. This control traffic uses up a portion of the transmission bandwidth. Since the transmission bandwidth is finite, as control traffic increases the bandwidth available for transmission of data decreases.

Consequently, use of the prior art polling scheme is undesirable when a significant number of receivers are participating in the polling process. As the number of receivers polled increases, so does the control traffic bandwidth associated with transmittal of polling requests, and responses. Hence, in a large multicast group a substantial range of the network's transmission bandwidth is consumed by control traffic. Data stream 3 illustrates how a substantial amount of control traffic can effectively reduce the available bandwidth for the transmission of data, and thereby diminish transmission efficiency. For example, in comparison with data stream 1, the data transmission rate in data stream 3 can at times be diminished by two thirds.

The aforesaid prior art schemes for data-loss recovery in a multicasting environment are inefficient and expensive as too much overhead is associated with error detection and fault tolerance functions and processes implemented therein. The above-referenced shortcomings effect the timely delivery of information in a network, and lead to additional failure states in data delivery.

Further, as these schemes are designed for multicasting of information to large audiences, they can be complex and can contain many lines of code. Thus, verifying the proper operation and maximizing the performance of these methods are burdensome' and render such methods unreliable, even when involving a relatively small audience. As such, simpler methods and solutions are needed to provide for more reliable and efficient multicasting, particularly in cases where the number of participants in the multicast group is not substantially large.

SUMMARY OF THE INVENTION

A method and apparatus for efficient and reliable multicasting in a network environment is provided. In embodiments of the invention, a sender transmits identical information encapsulated in data packets to a plurality of receivers participating in a multicast session. Periodically, receivers submit responses that include "control data" regarding the loss or receipt of data packets transmitted by the sender. Using this information a sender retransmits any undelivered packets to intended receivers.

In embodiments of the invention, data loss reports are accumulated and are submitted at predetermined but adjustable time intervals to minimize the number of responses and therefore the amount of control information generated at each time interval by each receiver. Further, responses are automatically generated by receivers at fixed and tunable time intervals without any polling from the sender. This also eliminates the need for dedication of a portion of the network bandwidth to control information associated with the polling requests.

In embodiments of the invention, packet loss responses are generated at time intervals that are adjustable based on the performance of the receivers. A time interval in generation of packet loss information may result in a lower error correction rate. However, since the control traffic that results from the generation of the responses is monitored, the failure states associated with an over congested network bandwidth are minimized. Therefore, the multicasting takes place at a more reliable and predictable rate.

DETAILED DESCRIPTION OF THE INVENTION

The invention provides a method and apparatus for small-scale reliable multicasting of information. This is accomplished by constantly monitoring and adjusting the data transmission rate and participant response rate so that the data is transmission rate is maximized and data loss rate is minimized. For example, if many participants join in a multicast session at one time, then the receivers are directed to reduce their response rate. Alternatively, when the number of participants decreases, the participants are permitted to increase their response rate, as a higher response rate provides for more efficient error detection and faster data recovery rates.

In embodiments of the invention, the response rate is monitored and adjusted by the sender. In other embodiments, the response rate is monitored and adjusted by the receivers or a plurality of receivers. Response periods can be a function of time, or a function of number of data packets received by a receiver (e.g., responses are submitted every 5 milliseconds or after receipt of 5 packets).

In embodiments of the invention, data transmission rate is monitored and adjusted based on data-loss information contained in responses submitted by the receivers. One or more embodiments of the invention are implemented to optimize the data transmission rate by detecting the weak receivers in the network and transmitting data packets to them such that the data-loss rate is minimized. Thus, receivers identified as weak receivers are grouped separately and data packets are transmitted to them at a slower pace. A lower transmission rate reduces the data-loss rate and consequently also reduces the retransmission rate associated with retransmission of lost packets.

In one or more embodiments of the invention, retransmission of data packets is accomplished via a multicast to all receivers, if many receivers have reported that data packets missing. Alternatively, if only a few receivers have failed to receive those packets, then the packets are retransmitted to those few receivers by a single transmission (unicast) to each one.

In embodiments of the invention, a monitoring window tracks the receipt status of undelivered data packets. Additional monitoring windows may also track the receipt status of data packets for a specific group of receivers (e.g. receivers having low reception rates).

In the following description, numerous specific details are set forth in order to provide a more thorough understanding of the present invention. It will be apparent, however, to one skilled in the art, that the present invention may be practiced without these specific details. In other instances, well-known features have not been described in detail not to unnecessarily obscure the invention.

Efficient and Reliable Multicasting

Figure 2:
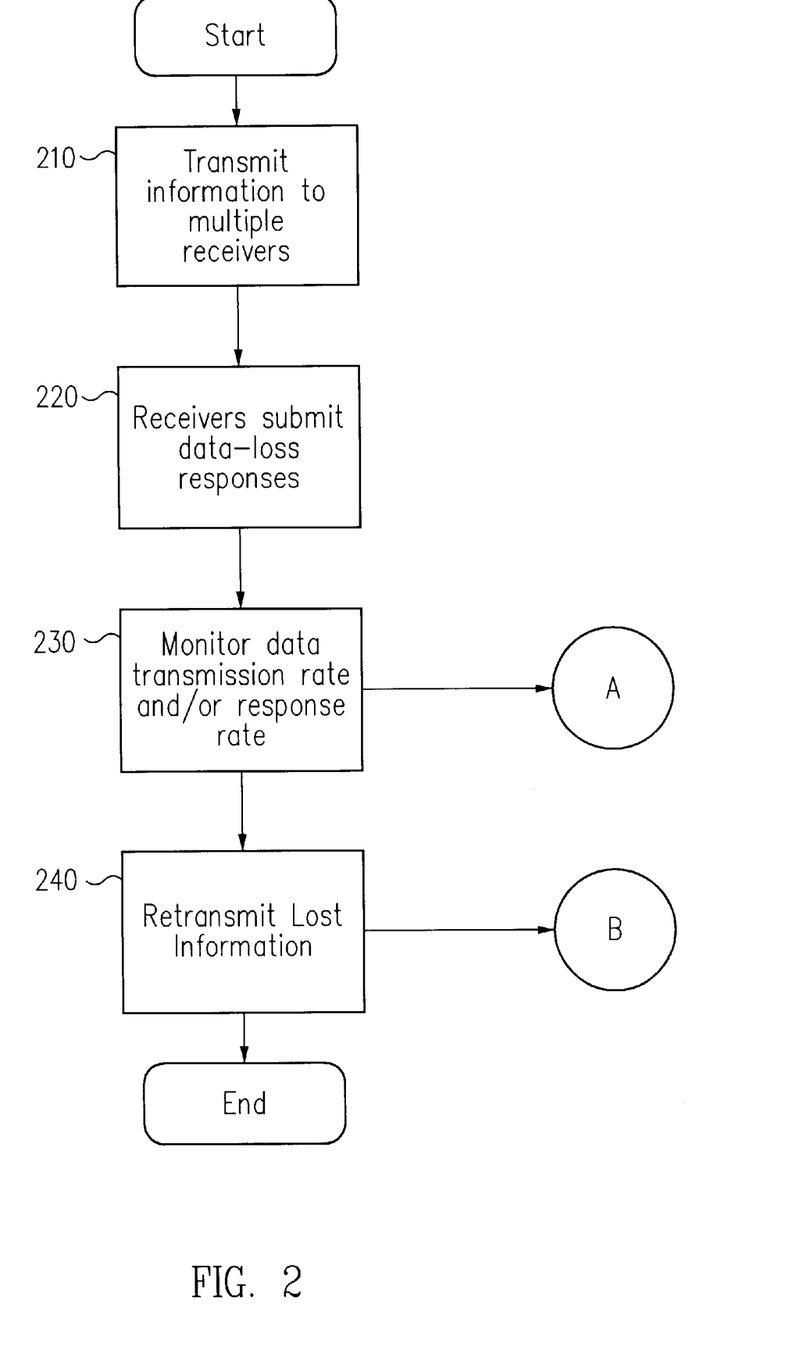
FIG. 2 is a flow diagram illustrating a method for information multicasting according to an embodiment of the invention.

Embodiments of the invention implement a method configured to multicast information from at least one sender to a plurality of receivers, in a computer network. FIG. 2 is a flow diagram illustrating a method for information multicasting according to an embodiment of the invention. At step 210, a sender transmits packets of information to multiple receivers. Due to limitations and faults associated with most computer networks, some packets may get lost on the way to the receivers. Thus, at step 220, one or more receivers submit data-loss responses to the sender. These data-loss responses each comprise "control data" (or feedback) that indicate the data packets that have been received or lost by the respective receivers. For example, where the sender has transmitted information packets 1 through 20 to a number of receivers, a response from a receiver may include control data that indicates that packets 1 through 7, and 14 through 20 have been received, but packets 8 through 13 are missing.

Data packets and data-loss responses are transmitted at a certain rate. Typically, a higher response rate allows for faster error detection and data recovery. However, it also creates additional network traffic also referred to as "control traffic" (generated by data-loss responses that include control data).

To enhance transmission throughput, at step 230, data transmission and response rates are monitored. To monitor these rates, at step A, as further discussed below, control data in submitted responses is analyzed to detect lost information packets and to determine an efficient method for their retransmission. Further, a receiver's response rate and/or a sender's transmission rate are/is analyzed and adjusted, so that the control traffic bandwidth and the data transmission bandwidth are maintained at a desirable range.

At step 240, lost information packets are retransmitted to one or more receivers. The details of the manner in which data is retransmitted (e.g., retransmission rate, and retransmission policy) are further illustrated in FIG. 5 (step B), and are further discussed below.

Response Rate

The frequency at which responses are transmitted from the receivers to the sender establishes a receiver's response rate. The response rate is dependent upon one or more thresholds. These thresholds control the length of delay between each response. In one or more embodiments, this threshold is time based. For example, after submitting a response (at step 220), a receiver may wait for at least 5 milliseconds to submit another response. Thus, the responses are submitted at 5 millisecond intervals. In another embodiment, a threshold may be based on the number of packets received by a receiver. For example, a receiver may delay submitting a response until 5 data packets have been received.

In embodiments of the invention, the thresholds are monitored to adjust the delay in between responses for maximum data transmission efficiency. There are advantages in having long delays in between responses. First, a longer delay results in a lower response rate; therefore less bandwidth is allocated to control traffic (i.e., traffic associated with transmission of responses). Second, longer delays between responses result in a more comprehensive feedback with respect to the delivery status of packets.

For example, a response submitted at 5-millisecond (or 5-packet). intervals may include information indicating that packets 8 through 13 have not been received by a receiver. However, there is a possibility that packets 8 through 13 will be received by the receiver 2 milliseconds (or 2 packets) after the response was submitted. If the threshold value is set at 7 milliseconds (or 7 packets), submission of a response is delayed until packets 8 through 13 are received. Therefore, those packets will not be reported missing, and will not be retransmitted. Thus, longer delays reduce the time and overhead associated with evaluation of responses and retransmission of lost packets. Notably, in a multicast environment, the overhead associated with the evaluation and retransmission of data can be substantial and expensive, as multitudes of receivers can participate in the multicast session.

While a longer response interval may result in more comprehensive responses and less network traffic, it can also result in a longer delay in data repair and recovery. For example, where threshold value for responding is set at 7 milliseconds (or 7 packets), it takes a receiver a longer time to submit, and the sender a longer time to receive notification of an error in delivery of data packets than when the threshold value is 5 milliseconds (or 5 packets).

A short response time is desirable as it results in faster error recovery. However, shorter response intervals result in a high response frequency which can overly congest the network traffic with control data, especially where many receivers are participating in a multicast environment. Thus as it is further described below, in embodiments of the invention, the response threshold values are controlled so that error detection and repair functions are optimally achieved without overly burdening the network bandwidth with control traffic. The threshold values may be controlled by either the sender or the receivers depending on the error detection and repair schemes implemented to optimize the efficiency of the multicast transmission.

1. Sender Controlled Response Rate

Figure 3:
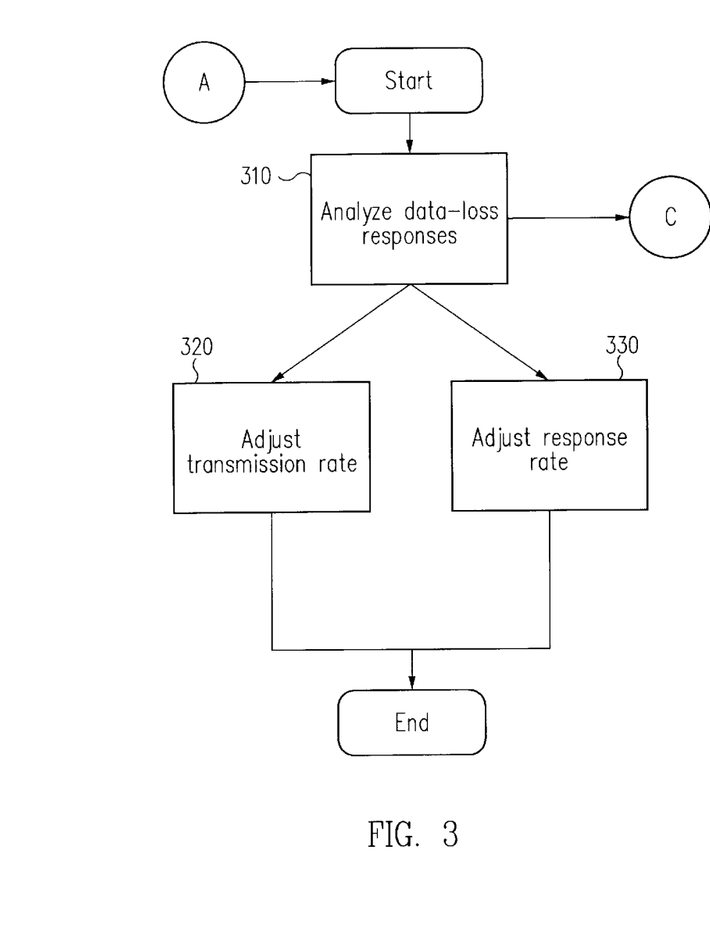
FIG. 3 is a flow diagram demonstrating the manner in which responses submitted by receivers are utilized, according to one or more embodiments of the invention.

Embodiments of the invention implement a method for multicasting information wherein the response rate is controlled by the sender. FIG. 3 is a flow diagram demonstrating the manner in which responses submitted by receivers are utilized, according to one or more embodiments of the invention. At step 310, the sender analyzes data-loss responses generated by the receivers. The sender adjusts the response rate at step 330, so that the multicasting of information is accomplished most optimally (i.e. minimizing the network traffic, and maximizing error recovery and repair.) If the sender determines that the frequency of responses is too high (i.e., too much network congestion), then the sender requests from the receivers to slow down the rate at which responses are generated. For example, instead of generating a response at every 5 milliseconds, the receivers may generate a response at every 10 milliseconds reducing the amount of control traffic generate per unit of time.

Alternatively, at step 310, a sender may determine that the frequency of responses is too low (i.e., slow error detection, and data recovery time). Then the sender causes the response rate to be adjusted, at step 330, so that the responses are generated more frequently. For example, the sender may adjust the response frequency from 5 milliseconds to 2 milliseconds, so that faults in data delivery are reported, analyzed and repaired more rapidly, as discussed above.

In embodiments of the invention, the sender may adjust the response frequency, at step 330, based on the number of participants in a multicast session. For example, to avoid the over congestion of the network bandwidth with control traffic, the sender requests the receivers to reduce their response rate, if it detects an increase in the number of participants.

Alternatively, the sender may request the receivers to increase their response rates if it detects a reduction in the number of participants. More network bandwidth becomes available once a number of receivers terminate their participation in the multicasting session. Thus, the remainder of participating receivers can take advantage of the additional available bandwidth by submitting more responses per unit of time.

2. Receiver Controlled Response Rate

In one or more embodiments of the invention, the response rate is monitored at step 230, by a plurality of receivers participating in the multicast session. As it is further demonstrated in FIG. 3, in embodiments of the invention, receivers self-monitor the rate at which data-loss responses are submitted by analyzing the previously submitted data-loss information at step 310.

For example, each receiver may be submitting data-loss packets in 5 millisecond intervals. If the receiver is notified that additional participants have joined the multicast session, then the receiver reduces its response rate at step 330, for example, by sending out data-loss packets at 10 millisecond intervals. Alternatively, with a reduction in the number of participants in a multicast session, in embodiments of the invention, a receiver increases its response rate by submitting data-loss responses at shorter time intervals.

In embodiments of the invention, the adjustment of the response rate is based on a report generated by all receivers collectively. The receivers may be divided into several groups and may exchange participation reports indicating, for example, an estimated number of participants in each group. This report is updated periodically, appraising the receivers or groups of receivers on how to adjust their response rate, at step 330, so that the network transmission bandwidth is optimally configured.

3. Monitoring Window

Embodiments of the invention are implemented to monitor the status of those transmitted packets the receipt of which has not been acknowledged. Referring to FIG. 3, at step 310, information contained in submitted data-loss packets is analyzed. In addition to utilizing this information for adjusting the data transmission and response rates, at step C, the generated feedback is also used to track the receipt of an information packet by receivers participating in a multicast session (as further demonstrated in FIG. 4).

Figure 4:
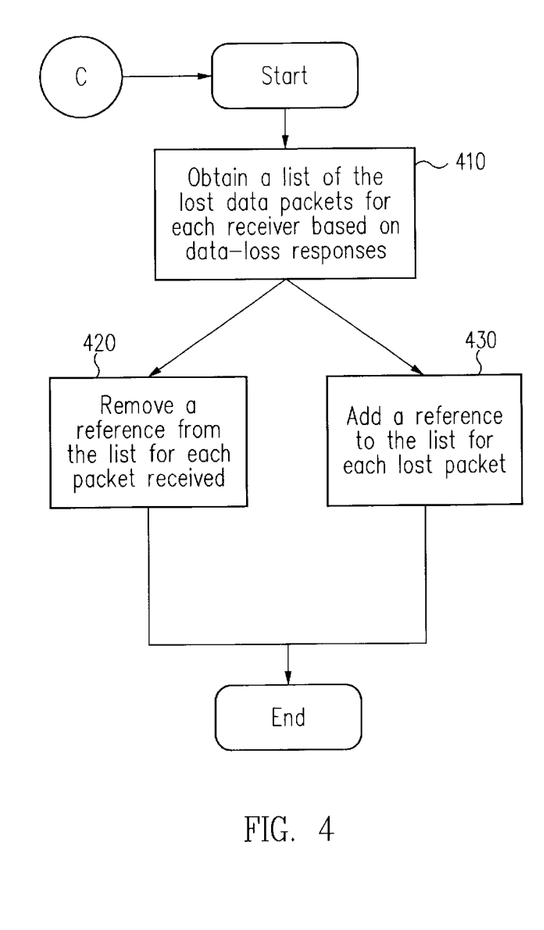
FIG. 4 is a flow diagram of a method for monitoring data packets that have not been received by receivers in a multicast session, according to embodiments of the invention.

FIG. 4 is a flow diagram of a method for monitoring packets that have not been received by receivers in a multicast session, according to embodiments of the invention. A monitoring window is implemented that keeps a record of those transmitted packets that have not been received by the receivers, or groups of receivers. At step 410, responses generated by receivers are analyzed at each time interval to generate a list of the lost data packets for each receiver.

For example, data packets 1 through 7 may be transmitted by the sender to a receiver that acknowledges the receipt of packets 1 through 5, by submitting a response. At step 310, the receiver's response is analyzed. As the receipt of packets 6 and 7 by the receiver remains outstanding, at step 410 a list ("list of lost packets") is obtained for that receiver. The list includes a reference to all the transmitted packets that have not yet been received by the receiver. At step 430, references are added to the list for the lost packets 6 and 7, for example.

Once a transmitted packet is received by a receiver, then it is determined whether the above-referenced list of lost packets contains any references to the received packet. If so, references to that packet are removed form the list, at step 420. In the above example, when packets 6 and 7 are received by the receiver then the list of lost packets is obtained for that receiver at step 410. At step 420, references to packets 6 and 7 are removed from the list.

Embodiments of the invention also comprise a global monitoring window that tracks references to lost packets for all receivers in the multicast session. For example, at step 410, a list of all undelivered data packets to any receiver in the multicast session is obtained. At step 420, every time a receiver responds with feedback information indicating the loss of one or more packets, entries are made in the list referencing those undelivered packets. Said entries remain on the list until they are removed, at step 420, when all receivers acknowledge the receipt of said packet or packets (i.e. the window is advanced to include the currently undelivered packets only).

One or more embodiments of the invention comprise a separately maintained global monitoring window for each group involved in the multicast session to track the undelivered information packets for participating receivers for each group. This allows for controlled monitoring and customization of the system for each group involved in the multicast session. For example, a network administrator can monitor the network for groups of receivers that do not perform well, or adjust the transmission and response rates for groups of receivers with inadequate data delivery rates.

Data Transmission Rate

Data is communicated at a certain rate between a receiver and a sender. For example in a milticast session, a sender may transmit to a receiver 10 data packets per millisecond. The higher the number of packets transmitted per unit of time, the faster is the speed of transmission. Due to limitations associated with a communication network, not all receivers in a network receive the data as fast as it is transmitted. Hence, some of the information packets for one reason or another may remain undelivered. Typically, the transmission rate is directly proportional to data-loss rate, meaning that a high transmission rate is associated with a high packet-loss rate. Thus, a high packet-loss rate may be remedied by lowering the rate of transmission.

Referring to FIG. 3, embodiments of the invention, at step 310, analyze the data-loss responses submitted by receivers and determine the necessary adjustments that need to be made to the transmission rate, so that the packet-loss rate is reduced. For example, if packet-loss rate is high, the transmission rate is adjusted to reduced the number of packets transmitted per unit of time; Alternatively, if the packet-loss rate is low an adjustment may be made, for example, to cause the transmission of greater number of packets from a sender to a receiver. These adjustments are continued until an optimal data transmission rate is achieved.

In a multicast session it is possible that a group of receivers display reception rates far below the other receivers. Instead of lowering the data transmission rate to all receivers, in embodiments of the invention, feedback submitted by the receivers is utilized to detect receivers with weak reception patterns. Thus, to lower the data loss rate, information packets are transmitted to such receivers at a lower rate than other receivers. In this manner, other receivers are not penalized for the poor performance of a few and can continue receiving information at the normal rate.

Alternatively, embodiments of the invention may identify the receivers with satisfactory data-loss responses, at step 310, and increase the rate at which data is transmitted to them, at step 320, to optimize the data delivery rate in a multicast session. For example, a receiver or a group of receivers may receive 9 packets out of every 10 packets transmitted by the sender, while another group may receive 4 packets out of every 10 packets, requiring the retransmission of 6 packets each time. Instead of cumulatively adjusting the transmission rate for all groups, it would be advantageous, for example, to increase the transmission rate for the former group with the low data-loss rate, and to reduce the transmission rate for the latter group with the high data-loss rate.

Figure 8:
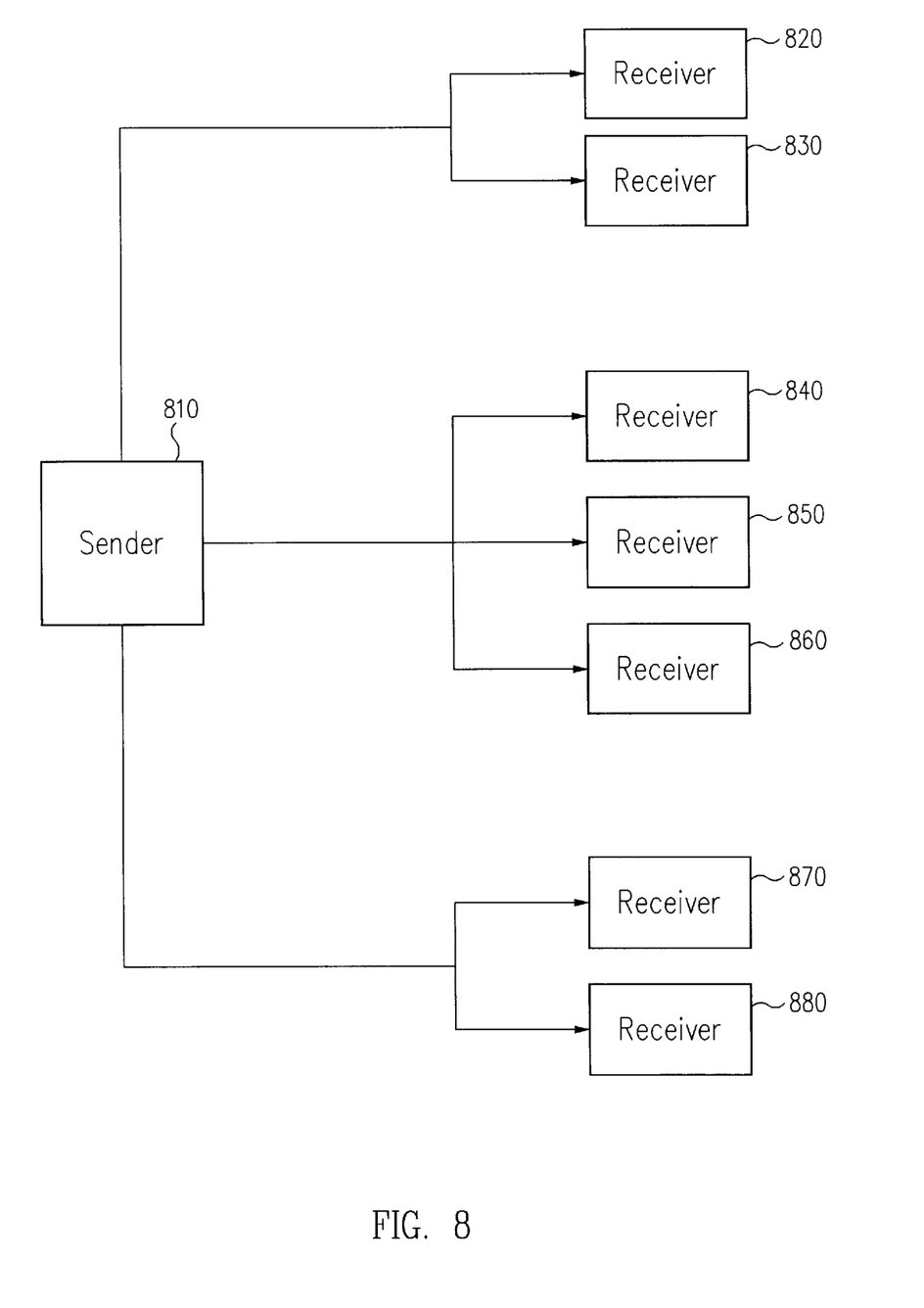
FIG. 8 illustrates a multicast environment where participants are grouped separately based on their reception rates, according to one or more embodiments of the invention.

In embodiments of the invention, the sender identifies the receivers with low reception rates and includes them in a separate multicast group with a lower data transmission rate. FIG. 8 illustrates a multicast environment where participants are grouped separately based on their reception rates, according to one or more embodiments of the invention. For example, receivers 820 and 830 may display higher data loss rates relative to other receivers 640 through 680. Sender 810 identifying the weak areas of reception in the network moves receivers such as receiver 820 and 830 to a separate multicast group and customizes the transmission rate such that the group participants are supplied with the information at a pace compatible with their reception rate, without penalizing other participants (i.e., receiver 840 through 880) that demonstrate acceptable data reception rates.

In one or more embodiments of the invention, a sender may choose to ignore responses submitted by a receiver. For example, a sender may detect a receiving group reporting many data losses and continue to transmit information at a steady rate, despite of the receivers high packet loss rate.

In embodiments of the invention, a sender may ask receivers with high data-loss rates to stop responding altogether, while the sender continues to transmit information at a steady rate. In one or more embodiments, the sender may use a combination of the aforementioned schemes to control various groups of receivers to maintain an optimal balance between the bandwidth used for the transport of control information and the bandwidth used for data transmission.

Data Retransmission

In embodiments of the invention, a sender retransmits lost data packets to receivers at step 240, based on responses submitted by the receivers at step 220. The data retransmission policy is illustrated in FIG. 5.

Figure 5:
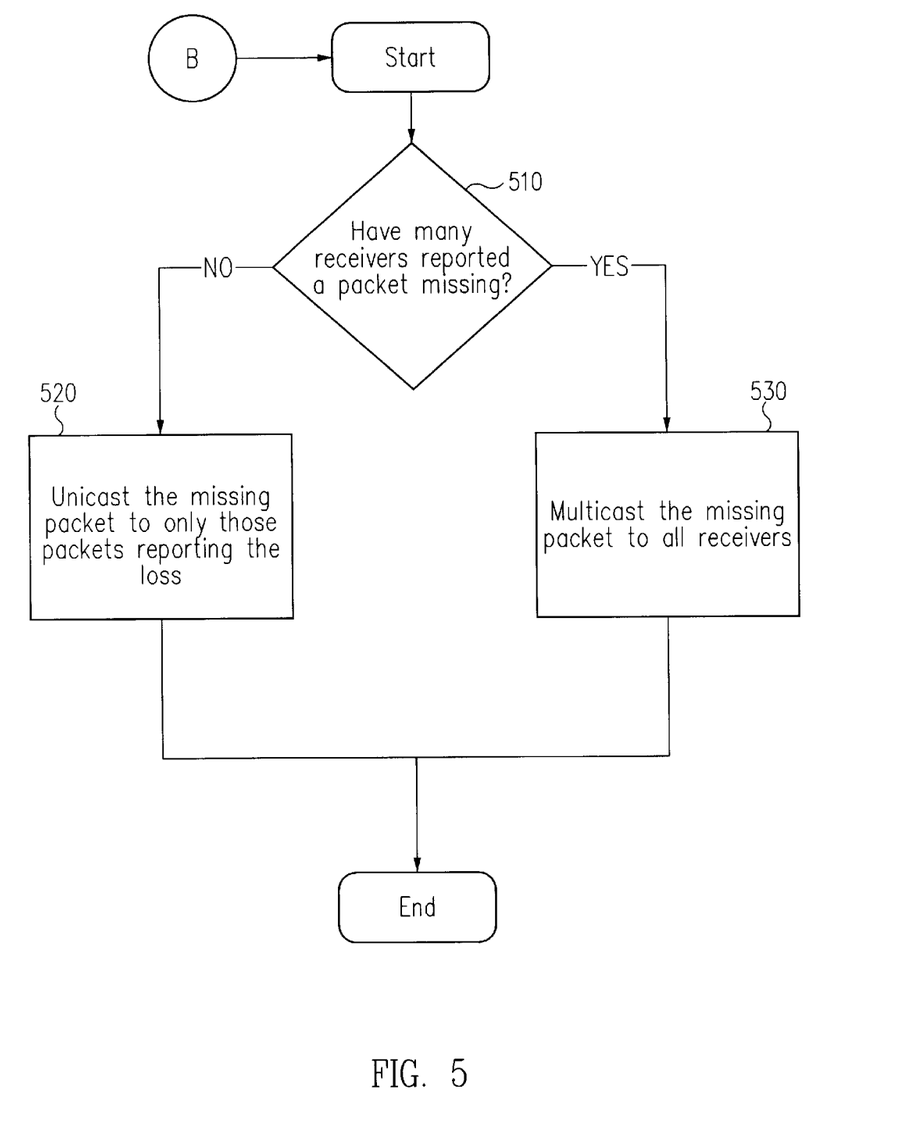
FIG. 5 is a flow diagram demonstrating the manner in which data is retransmitted to receiver participating in a multicast session, according to one or more embodiments of the invention.

FIG. 5 is a flow diagram demonstrating the manner in which data is retransmitted, according to one or more embodiments of the invention. At step 510, it is determined whether many receivers have reported an information packet missing. If so, then that packet is multicasted to the receivers participating in the multicast session, at step 530. The receivers that have already received the packet will simply ignore the newly retransmitted information. If a few receivers have failed to acknowledge the receipt of the information packet, however, the sender individually transmits (unicasts) that packet to each of those few receivers, at step 520.

For example, if a data packet has been multicasted to 100 receivers and the receipt of it has been acknowledge by 4 receivers, then the packet is multicasted to all 100 receivers. On the other hand, if only 4 out of 100 receivers have failed to received the packet, then that packet is sent to those 4 receivers, using a unicast transmission to each one. The decision of when to multicast and when to unicast lost packets may be made according to a heuristic (an analytically calculated predetermined approach), or based on the number of participating receivers and responses submitted by them, at the time of retransmission.

For example, if a group of receivers display a high packet-loss rate, then data retransmission to that group may take place more frequently than those receivers reporting a low packet-loss rate. A higher data retransmission rate will expedite the data recovery and repair process as receivers will receive the undelivered packets at a faster pace.

Although embodiments of the invention can be implemented to multicast information to numerous receivers, this invention scales well to multicasting groups with a relatively small number of participant. As such, this invention can be used as a back up for less reliable multicasting schemes that scale to larger audiences.

Embodiment of Computer Execution Environment

Hardware

Figure 1:
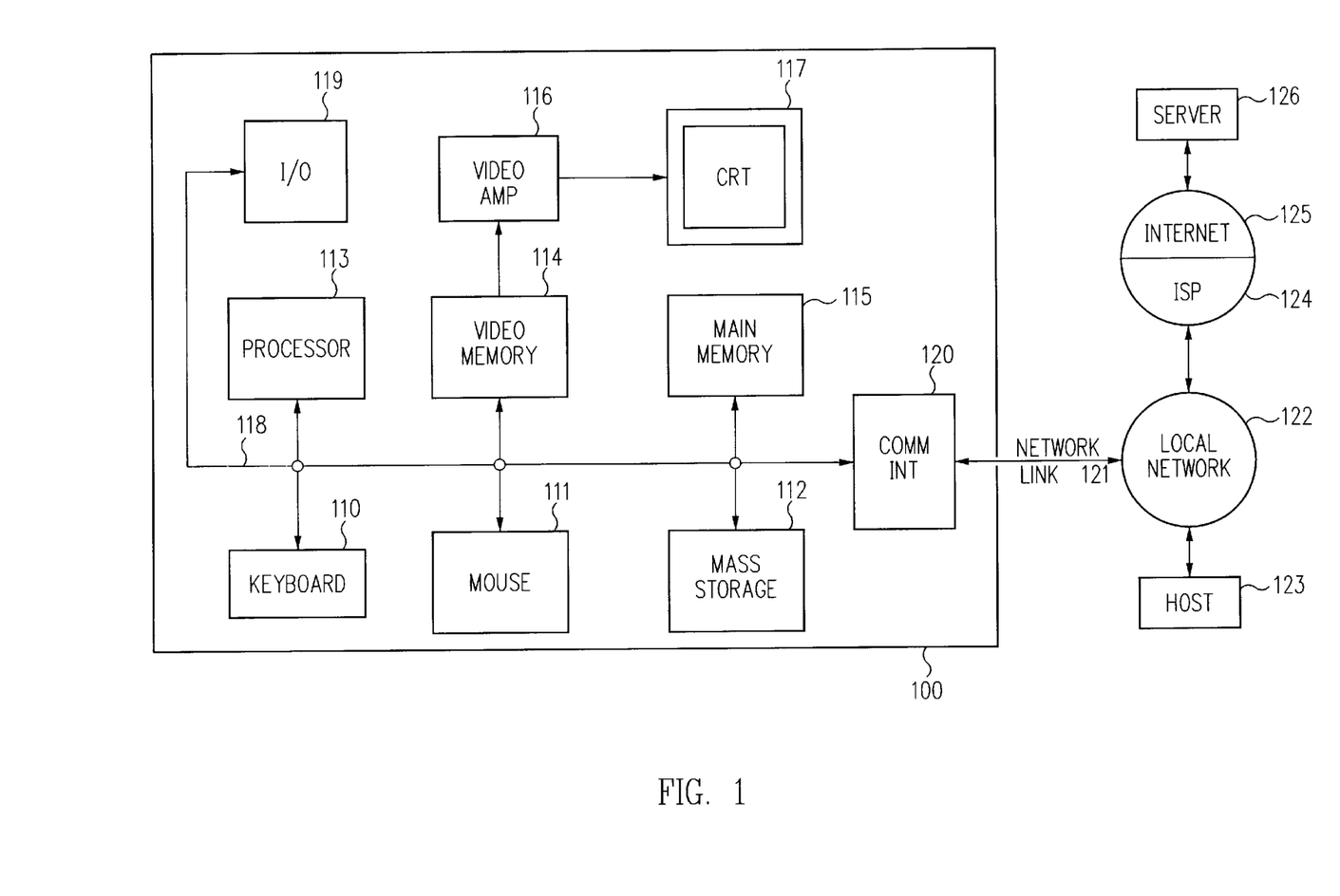
FIG. 1 is an illustration of a general purpose computer, according to one or more embodiments of the invention.

An embodiment of the invention can be implemented as computer software in the form of computer readable program code executed on a general purpose computer such as computer 100 illustrated in FIG. 1, or in the form of byte code class files executable by a virtual machine running on such a computer. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a SPARC™ microprocessor from Sun Microsystems, or a microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One part of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120. In accord with the invention, one such downloaded application is the method and apparatus for secure transfer of data streams described herein.

The received code may be executed by CPU 113 as it is received, and/or stored in mass storage 112, or other non-volatile storage for later execution. In this manner, computer 100 may obtain application code in the form of a carrier wave.

The computer systems described above are for purposes of example only. An embodiment of the invention may be implemented in any type of computer system or programming or processing environment.

Thus, a method and apparatus for multicasting information to a plurality of receivers in a computer network has been described in conjunction with one or more specific embodiments. The invention is defined by the claims and their full scope of equivalents.

What is claimed is:

1. A method configured to multicast information to a plurality of receivers in a computer network, said method comprising:

transmitting information to one or more receivers;

receiving one or more responses from said one or more receivers;

retransmitting information to said one or more receivers based on said one or more responses received;

monitoring said one or more receivers' response rates;

monitoring said information transmission rate; and adjusting said response rate for one or more receivers based, in part, on a change in the number of said plurality of receivers.

2. The method of claim 1, wherein said one or more responses include packet-loss feedback information.

3. The method of claim 1, wherein said one or more response rates are monitored by a sending node.

4. The method of claim 1, wherein said one or more response rates are monitored by said one or more receivers.

5. A system comprising:

a processor;

a memory;

code executed by said processor configured to multicast information to a plurality of receivers in a computer network, said code comprising:

a method for transmitting information to one or more receivers;

a method for receiving one or more responses from said one or more receivers;

a method for retransmitting information to said one or more receivers based on said one or more responses;

monitoring said one or more receivers' response rates;

monitoring said information transmission rate; and a method for adjusting said response rate for one or more receivers based, in part, on a change in the number of said plurality of receivers.

6. A computer program product comprising:
a computer usable medium having computer readable program code embodied therein, configured to multicast information to one ore more receivers in a computer network; said computer program product comprising:
computer readable code configured to cause a computer to transmit information to one or more receivers;
computer readable code configured to cause a computer to receive one or more responses from said one or more receivers;
computer readable code configured to cause a computer to retransmit information to said one or more receivers based on said one or more responses;
computer readable code configured to cause a computer to monitor said one or more receivers' response rates;
computer readable code configured to cause a computer to monitor said transmission rate; and
computer readable code configured to adjust said response rate for one or more receivers based, in part, on a change in the number of said one or more receivers.

7. A method configured to multicast information to a plurality of receivers in a computer network, said method comprising:
transmitting information to one or more receivers;
receiving one or more responses from said one or more receivers;
retransmitting information to said one or more receivers based on said one or more responses received;
monitoring said one or more receivers' response rates;
monitoring said information transmission rate;
monitoring the receipt status of said transmitted information; and
adjusting said response rate for one or more receivers based, in part, on the number of packets received by one or more receivers.

8. The method of claim 7, wherein said step of monitoring the receipt status of said transmitted information comprises:
referencing the non-delivery of said transmitted information in a list;
removing a reference from said list, when the receipt of said transmitted information is acknowledged by a receiver.

9. The method of claim 7, wherein said receivers are divided into at least two groups based on their packet-loss feedback information.

10. The method of claim 9, wherein transmission rates to said at least two groups are adjusted based on said groups' packet-loss feedback information.

11. A system comprising:
a processor;
a memory;
code executed by said processor configured to multicast information to a plurality of receivers in a computer network, said code comprising:
a method for transmitting information to one or more receivers;
a method for receiving one or more responses from said one or more receivers;
a method for retransmitting information to said one or more receivers based on said one or more responses;
monitoring said one or more receivers' response rates;
monitoring said information transmission rate; and
a method for adjusting said response rate for said one or more receivers based, in part, on packet-loss feedback information included in said responses.

12. A computer program product comprising:
a computer usable medium having computer readable program code embodied therein, configured to multicast information to one ore more receivers in a computer network; said computer program product comprising:
computer readable code configured to cause a computer to transmit information to one or more receivers;
computer readable code configured to cause a computer to receive one or more responses from said one or more receivers;
computer readable code configured to cause a computer to retransmit information to said one or more receivers based on said one or more responses;
computer readable code configured to cause a computer to monitor said one or more receivers' response rates;
computer readable code configured to cause a computer to monitor said transmission rate; and
computer readable code configured to adjust said response rate for one or more receivers based, in part, on packet-loss feedback information.

13. The computer program product of claim 12, wherein said one or more response rates are monitored by said at least one sender.

14. The computer program product of claim 12, wherein said one or more response rates are monitored by said plurality of receivers.

15. The computer program product of claim 12, wherein said receivers are divided into at least two groups based on their packet-loss feedback information.

16. The computer program product of claim 15, wherein the transmission rate to said at least two groups are adjusted based on said groups' packet-loss feedback information.

* * * * *